Figure 1:
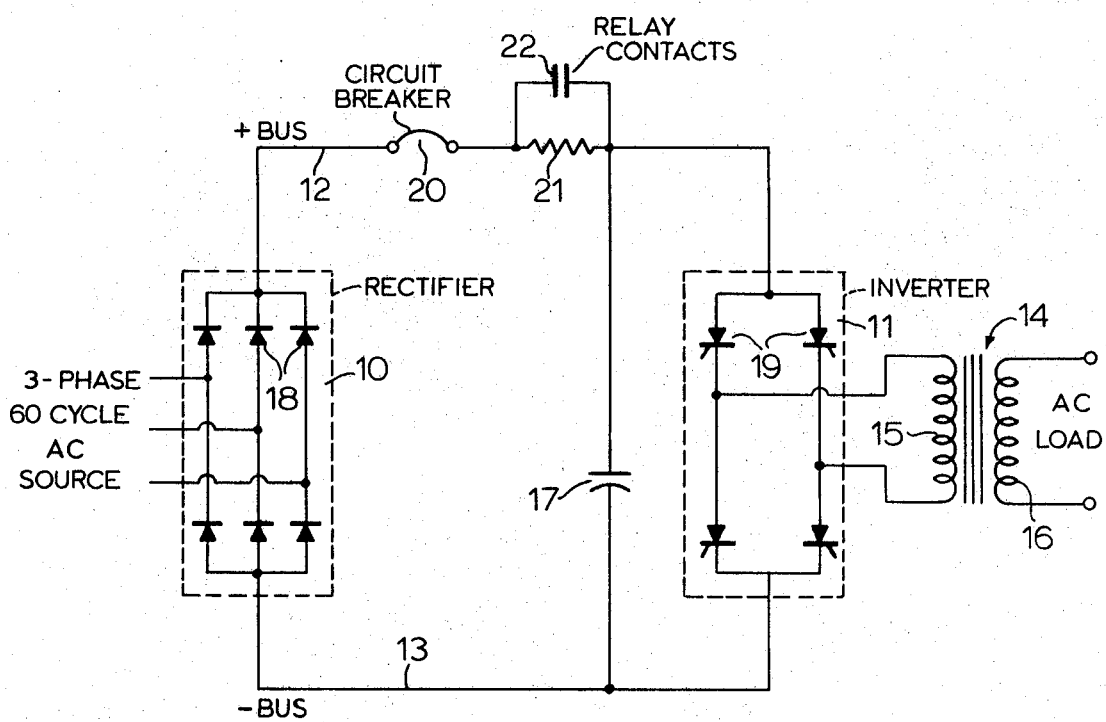

United States Patent

[11] 3,631,332

| [72] | Inventor | Dennis F. Williamson<br>Media, Pa. |
|---|---|---|
| [21] | Appl. No. | 71,579 |
| [22] | Filed | Sept. 11, 1970 |
| [45] | Patented | Dec. 28, 1971 |
| [73] | Assignee | Canadian General Electric Limited<br>Toronto, Canada |
| [32] | Priority | Apr. 14, 1970 |
| [33] | | Canada |
| [31] | | 080,030 |

[54] INVERTER STARTING CIRCUIT
5 Claims, 3 Drawing Figs.

[52] U.S. Cl..................................................... 321/45 S,
321/2, 321/69
[51] Int. Cl............................................... H02m 5/40
[50] Field of Search............................................ 321/2, 45,
455, 60, 69; 331/113 A

[56] References Cited
UNITED STATES PATENTS
3,506,907   4/1970   Porterfield .................... 321/45 S Primary Examiner—William M. Shoop, Jr.
Attorneys—J. Wesley Haubner, Albert S. Richardson, Jr., Frank L. Neuhauser, Oscar B. Waddell and Joseph B. Forman

ABSTRACT: A frequency changer has a semiconductor rectifier for converting commercial frequency AC to DC, a thyristor inverter for converting the DC to adjustable frequency AC, and a capacitor bank connected across the input to the inverter for reactive inverter load control. According to the invention, the inverter is started by charging the capacitor through a resistor from an auxiliary DC source at a voltage significantly higher than the rectifier DC voltage. A relay responsive to a capacitor voltage slightly above the rectifier voltage connects the rectifier to the capacitor-inverter combination and disconnects the capacitor charging circuit. The switchover takes place at a capacitor voltage equal to or slightly in excess of the rectifier voltage.

LEGEND
20 – CIRCUIT BREAKER CONTACTS
A – COIL OF RELAY HAVING NORMALLY OPEN CONTACTS A1.
B – "    "    "    "    "    "    "    B1.
C – "    "    "    "    "    "    " C2, C3, AND NORMALLY
        CLOSED CONTACTS C1.

INVENTOR.
DENNIS F. WILLIAMSON,
BY
Albert S. Richardson Jr
ATTORNEY

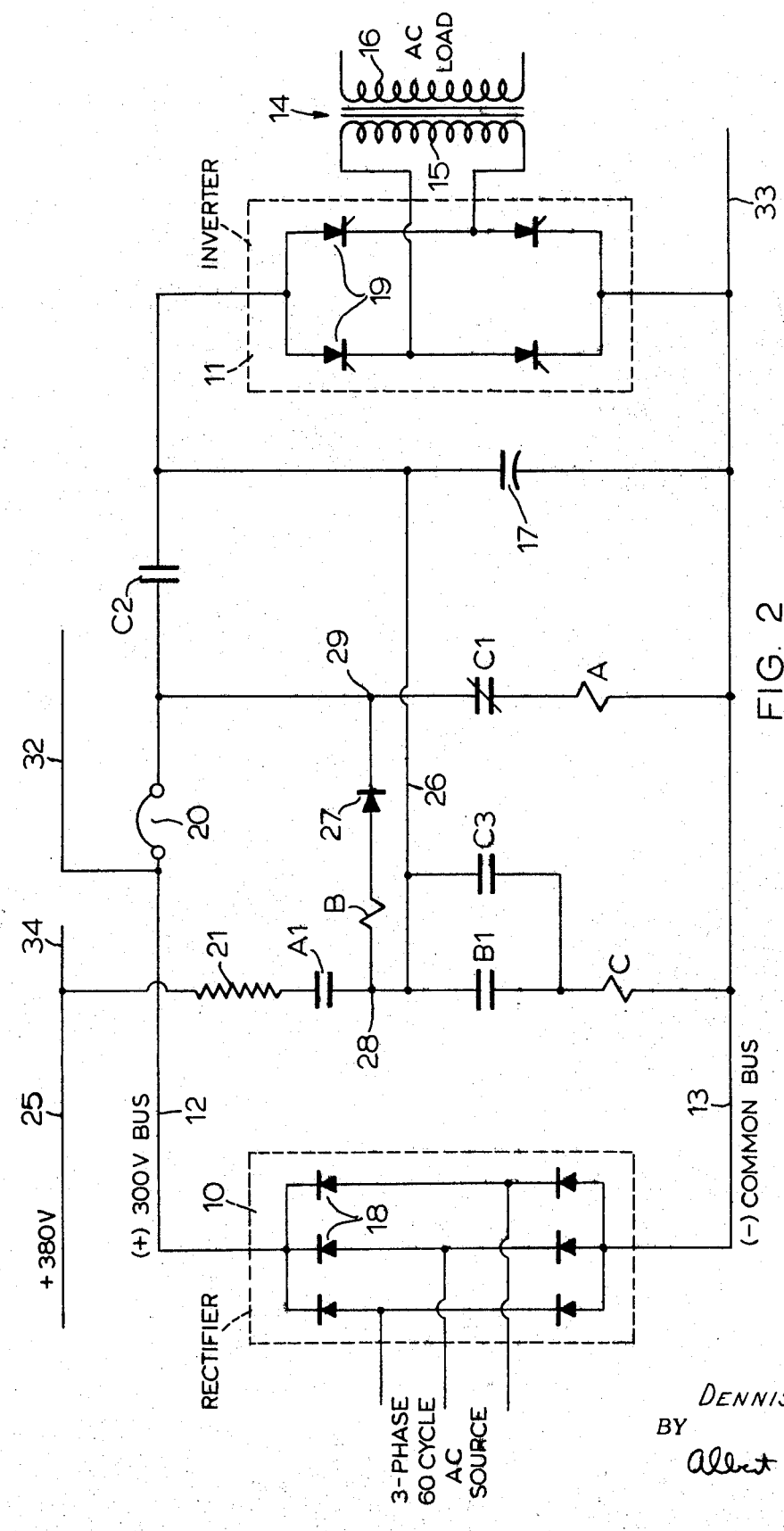

INVERTER STARTING CIRCUIT

This invention relates to electric circuits employing a semiconductor rectifier for converting commercial frequency alternating current into direct current and a semiconductor inverter for converting the direct current into adjustable frequency alternating current, and in particular to means for starting the inverter.

There are applications in industry and elsewhere for alternating current power of which the frequency can be adjusted within a particular frequency range. A well-known way for obtaining variable frequency power is by means of a static circuit consisting essentially of a rectifier and an inverter. This type of circuit uses semiconductor rectifier elements for converting the commercial frequency alternating current into direct current and controlled semiconductor elements for converting the direct current into alternating current of the desired frequencies. The inverter, i.e., the DC to AC converter, is a self-excited or impulse commutated circuit capable of operating solely from a DC source and providing an AC output of a frequency range adjustable from about 10 to about 200 cycles per second at power factors ranging from nearly zero leading to nearly zero lagging. A transformer is usually connected to the output terminals of the inverter for purposes of changing the voltage of the adjustable frequency alternating current to the value required for the load.

In order to operate successfully over such a wide range of conditions a large capacitor bank is connected to the input terminals of the inverter, i.e., across the DC buses connecting the rectifier to the inverter. The transformer and inverter are compatible during normal operation, but during start-up or shutdown they are not unless special procedures are carefully observed. If, for example, the transformer core is in a highly magnetized state on starting the inverter, the inverter could drive the core into saturation and thereby cause the magnetizing current to be high enough to cause failure of the inverter. As a result, in starting the inverter, the magnetized state of the transformer core must be known and the initial voltage applied to the transformer must take this state into account so that it will be of a polarity that does not drive the core into saturation, or the voltage must be applied very gradually to the transformer. Considering now the DC side of the inverter, obviously it is not feasible to suddenly connect the large capacitor bank to the DC source. The inrush currents would be unacceptably large.

Heretofore, starting the inverter involved first charging the capacitors with DC from the rectifier-inverter bus through a resistance ahead of the capacitor-inverter combination and then placing a shunt around the resistance. The resistance was either a rheostat or a resistor of fixed resistance value. In the case of a rheostat, the resistance thereof is reduced gradually until the capacitors are at approximately bus voltage, after which a pair of contacts are closed to place the shunt around the rheostat. Adjusting the rheostat is, however, a manual operation depending on the skill of the operator. When a resistor of fixed resistance value is used, the capacitors cannot be charged to the full bus voltage; as a result, the inverter and the capacitor are subjected to a substantial power surge when the shunt is placed around the resistor by a pair of contacts closing. In a circuit employing a number of inverters supplied with DC from a single rectifier, the disturbance to the DC caused by starting one inverter might well upset operation of one or more of the other inverters already in operation.

The object of this invention is to provide a circuit for automatically starting an inverter in a rectifier-inverter frequency changing circuit without subjecting the inverter to the aforementioned surges.

According to the invention this is done by charging the capacitor through a resistor from an auxiliary DC source at a voltage higher than the voltage on the rectifier-inverter buses, detecting the point at which the capacitor voltage is slightly above the bus voltage, and in response to the voltage reaching this point immediately connecting the inverter to the buses and disconnecting the auxiliary source from the resistor.

Figure 3:
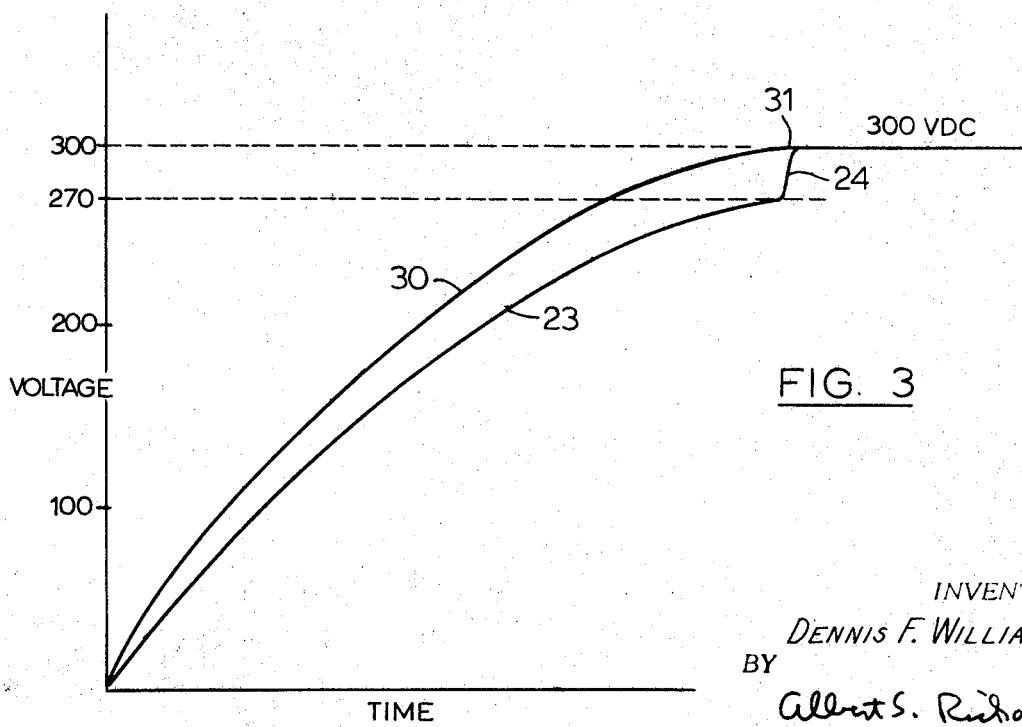

An embodiment of the invention will now be described with reference to the accompanying drawings, in which FIG. 1 is a diagram of a prior art inverter starting circuit;

FIG. 2 is a diagram of an inverter starting circuit according to the invention; and FIG. 3 is a graph illustrating the voltage characteristics during starting for the circuits of FIGS. 1 and 2.

In FIG. 1 there is shown a frequency-changing circuit consisting essentially of a rectifier 10 supplied with 3-phase, 60-cycle alternating current, an inverter 11, positive and negative buses 12 and 13 respectively, connecting the DC output of the rectifier to the input of the inverter, a transformer 14 having its primary winding 15 connected to the output of the inverter and its secondary winding 16 to a load and a bank of capacitors 17 connected across buses 12 and 13 at the inverter input terminals. Rectifier 10 may be a bridge configuration of silicon diodes 18 and inverter 11 a configuration of thyristors. Capacitor bank 17 has sufficient capacitance to enable it to handle the reactive power of the load on the inverter. Rectifier 10 converts the alternating current to direct current, inverter 11 converts the direct current back into alternating current of a frequency ranging from about 10 to 200 c.p.s. through control of conduction of the thyristors, and transformer 14 changes the inverter output voltage to values suitable for application to the load. Bus 12 between the rectifier and capacitor-inverter combination includes arrangement of a pair of contacts 20 of a circuit breaker and a capacitor charging resistor 21 shunted by a pair of normally open contacts 22 of a time delay relay. The circuit described so far is known.

To start the inverter in accordance with the prior art method, AC power from the 60-cycle source is applied to the input terminals of rectifier 10, thereby energizing buses 12 and 13 to their full DC voltage, e.g., 300 volts. Contacts 20, which are normally open when the rectifier is deenergized, now close to place resistor 21 in bus 12 between the rectifier and the parallel combination of inverter 11 and capacitor bank 17. This resistor has normally open relay contacts 22 in parallel with it. As soon as the breaker contacts close, capacitor 17 begins to charge up through resistor 21. After a timed interval long enough to allow the capacitor to charge to the highest voltage possible, e.g., about 270 volts or 90 percent of the bus voltage, relay contacts 22 close, placing a highly conductive shunt around the resistor. Immediately upon contacts 22 closing, the inverter and capacitor are subjected to the full bus voltage. This is a sudden increase from about 270 to 300 volts. The voltage across the capacitor is illustrated in FIG. 3 where the sloping curve 33 represents charging through the resistor and the steep curve 24 the surge cause by the closing of contacts 22.

Reference should now be made to FIG. 2 where the new inverter starting circuit is shown applied to the rectifier-capacitor-inverter combination of FIG. 1. In this figure, the time delay relay having contacts 22 is no longer used. Three new relays A, B and C have been added. Relay A has normally open contacts A1, relay B normally open contacts B1, and relay C normally closed contacts C1 and open contacts C2 and C3. By normal contacts condition is meant the position of the contacts when the relay coil is not energized. Coils A and C are rated for use on the relatively high voltages appearing across bus 12 and 13, and coil B is rated for use on relatively low voltages, e.g., 4 to 6 volts. Contacts C2 are located in bus 12 between breaker contacts 20 and the capacitor-inverter combination. The capacitor charging resistor 21 now has one terminal connected to an auxiliary DC bus 25 and its other terminal to capacitor 17 by way of contacts A1 and lead 26. Bus 25 is at a positive DC voltage significantly higher than the voltage on bus 12 and shares the same negative bus 13. When, for example, bus 12 is at 300 VDC bus 25 may be at 380 VDC. Relay coil A and contacts C1 are connected in series from a point in bus 12 between contacts 20 and C2 and bus 13. Coil C is connected to lead 26 through the parallel contacts B1 and C3 and to bus 13. Coil B and a diode 27 are connected in series between a point 28 in the resistor charging circuit and a point 29 in the coil A and contact C1 circuit. The polarity of the diode is such that current will flow in the circuit only when point 28 is at a higher positive voltage than point 29.

Starting the inverter in the circuit of FIG. 2 will now be described. First, DC buses 25, 12 and 13 are fully energized. At this particular point breaker contacts 20 are open and all the relay coils are not energized. Contacts 20 are then closed, placing relay coil A across buses 12 and 13 through the normally closed contacts C1. Once coil A is energized, the relay closes its contacts A1, allowing capacitor 17 to begin charging from the high-voltage bus 25 by way of resistor 21, contacts A1, and conductor 26. Point 29 is now at the voltage of bus 12, i.e., +300 v. and point 28 is at the voltage level of the capacitor. As the capacitor charges, the voltage at point 28 rises, and on attaining a value slightly in excess of the voltage on bus 12, current begins to flow from point 28 to point 29 through coil B and diode 27 and from point 29 to the common negative bus by way of contacts C1 and coil A.

When the voltage at point 28 has an excess value of about 4 volts, i.e., a value of about 304 v., relay B closes its contacts B1, thereby placing coil C across buses 12 and 13. After a very brief time delay, contacts C2 and C3 close and C1 open. The opening of contacts C1 deenergizes coil A, thereby causing contacts A1 to open and disconnect the resistor from the capacitor. As the same time, the closing of contacts C2 connects the capacitor-inverter combination directly across buses 12 and 13. When contacts C1 open the circuit for coil B is also interrupted, and as a result contacts B1 open. However, before contacts B1 open, contacts C3 close to establish a holding circuit for coil C. This completes inverter starting. Coil C remains energized during operation of the system.

In FIG. 3, the capacitor charging voltage is represented by curve 30. It will be noted that the voltage now rises gradually to the 300-volt level and then merges with it without a surge as at 24 for the FIG. 1 circuit. A very small bump may sometimes appear in curve 30 in the region 31 where the curve merges with the 300-volt line due to the 4-volt excess needed to operate relay B. For all practical purpose bump will be so small as to be negligible.

If another inverter is to be operated from rectifier 10, it may be connected to the extensions 32, 33 and 34 of buses 12, 13 and 25 respectively. Preferably, this inverter and the starting circuit therefor will be the same as described with reference to FIG. 2 for inverter 11. A third or even more inverters may be operated from a single rectifier. In a multiinverter circuit of this nature, any one of the inverters may be started without disturbing other inverters already in operation.

What I claim as new and desire to secure by Letters Patent of the United States is:

1. In combination with a DC bus, an electric power rectifier connected between said DC bus and a source of alternating current to apply a direct voltage to said bus, an inverter having an input adapted to be connected to said bus for converting said direct voltage to an alternating output voltage, and at least one capacitor connected in parallel with said inverter input, a circuit for starting said inverter comprising:

a. an auxiliary source of direct current at a voltage higher than that of said DC bus;
b. a capacitor-charging resistor;
c. first means for connecting said resistor in series between said auxiliary source and said inverter input for starting the inverter; and
d. second means operative to connect said inverter input to said DC bus and to disconnect it from said auxiliary source when the voltage on said inverter input and parallel capacitor attains a magnitude approximately equal to the magnitude of the voltage on said DC bus.

2. The combination of claim 1 in which said second means includes means for sensing said capacitor voltage during inverter starting, said sensing means causing operation of the second means when the voltage sensed is at a value slightly exceeding the voltage on said DC bus.

3. In a frequency changer consisting essentially of a rectifier for converting alternating current to direct current; an inverter for converting direct current to alternating current; a transformer having its primary connected to the AC output of said inverter; at least one capacitor; a first bus interconnecting first terminals of one like polarity of the rectifier DC output, the inverter DC input, and the capacitor; a second bus connected to second terminals of the other like polarity of the rectifier DC output, the inverter DC input, and the capacitor; and a circuit for starting said inverter comprising first normally open circuit interrupter contacts in said second bus between said rectifier and the inverter-capacitor connection to that bus; a capacitor charging resistor; an auxiliary source of direct current including a terminal having the same relative polarity as said second terminal of said rectifier output and having higher voltage than said second rectifier output terminal; a circuit including second normally open interrupter contacts connected in series with said resistor between said auxiliary source terminal and said second terminal of said capacitor; first means energized from said first bus and a portion of said second bus between said first contacts and said second rectifier output terminal for closing said second contacts; voltage responsive means connected to said second capacitor terminal and to said bus portion, said voltage responsive means being operated by a small excess of capacitor voltage over bus voltage; and second means energized from said first bus and said second capacitor terminal by operation of said voltage responsive means, when energized said second means being operative to close said first contacts and to open said second contacts.

4. The starting circuit defined in claim 3 wherein said voltage responsive means is a relay having a low-voltage coil connected in series with a diode for current flow only due to said excess voltage.

5. The starting circuit defined in claim 3 in which third interrupter contacts are connected in said second bus between said bus portion and said second rectifier output terminal, said bus portion being energized from said rectifier output whenever said third contacts are closed.

* * * * *